United States Patent [19]
Scheublein et al.

[11] 3,773,346
[45] Nov. 20, 1973

[54] VEHICLE SUSPENSION SYSTEM

[75] Inventors: James K. Scheublein; Gary D. Swinney, both of St. Louis, Mo.

[73] Assignee: Moog Industries, Inc., St. Louis, Mo.

[22] Filed: Jan. 3, 1972

[21] Appl. No.: 215,037

[52] U.S. Cl. .............................. 280/124 R, 267/60
[51] Int. Cl. ............................................ B60g 11/16
[58] Field of Search .................. 280/124 R; 267/60, 267/180, 166

[56] References Cited
UNITED STATES PATENTS

| | | | |
|---|---|---|---|
| 3,572,678 | 3/1971 | Jerz | 267/60 |
| 3,486,763 | 12/1969 | Hexel | 280/124 R |
| 3,345,079 | 10/1967 | Wickham | 267/180 X |

*Primary Examiner*—Philip Goodman
*Attorney*—Frederick M. Woodruff et al.

[57] ABSTRACT

A vehicle suspension system which incorporates a novel variable rate rear suspension spring having two effective stages arranged such that the natural frequency will increase or decrease substantially the same amount as the natural frequency of the front suspension system will increase or decrease when load is added or removed. The rear suspension spring includes a first stage which combines both a constant pitch section and an increasing pitch section, and a second stage which comprises only the constant pitch section. The suspension system embodying the rear suspension springs of the foregoing character operates to maintain the front suspension natural frequency substantially equal to the rear suspension natural frequency under all loading conditions.

6 Claims, 4 Drawing Figures

VEHICLE SUSPENSION SYSTEM

BRIEF RESUME OF THE INVENTION

This invention relates to vehicle suspension systems and is particularly concerned with the provision of novel suspension springs in order to maintain the total vehicle suspension in balance, whereby substantially the same ride characteristic under all load conditions is maintained. The invention also relates to a suspension spring that will allow increase in the load carrying capacity of the vehicle without changing the original operating characteristics of such vehicle.

It is generally known that common vehicle designs strive for a suspension system such that the optimum ride characteristics are obtained when the vehicle is carrying two people in the front seat and with no load in the trunk other than the usual spare tire and jack equipment. It is also known that the ride characteristics rapidly deteriorate as load is applied to the vehicle, such as temporary objects placed in the trunk. Therefore, an objective of this variable rate coil spring is to maintain the optimum ride characteristics under all load conditions by keeping the front and rear suspensions in balance. This objective is well satisfied through a rear spring having a variable rate with two effective stages where the rate increases with respect to load and with respect to deflection such that the front suspension and rear suspension natural frequency will be equal under all load conditions. It is also an objective to increase the load carrying capacity of a vehicle and this is found to be automatically satisfied by the two effective stages characteristic for maintaining the vehicle suspension in balance or tune.

The limited concept of varying the rate of a coil spring is known from previous usage of variable rate springs, but the idea of a planned varying rate spring having two effective stages compatible to an automotive suspension system and its unique loading characteristics is new and different. The design intentions of the older variable rate springs were either to maintain constant frequency of the individual spring-mass system or to limit deflection under load. The complete automotive suspension system was never considered. This invention relates to maintaining the front suspension natural frequency equal to or balanced with the rear suspension natural frequency under all loading conditions. The front suspension natural frequency is not constant, but it will vary under various loading.

The spring design of this invention requires a percent of the total coils to be cancelled just by the normal vehicle weight. This design has not been achieved before and first appears to be a waste of steel, but the gain in lower noise level, caused by coil clash, and a gradual rate increase under all loads far outweights the steel cost. The addition of a coating of suitable material, such as a vinyl coating, decreases noise and for this application it is new.

BRIEF DESCRIPTION OF THE DRAWINGS

The present improvements in vehicle rear variable rate suspension springs having two effective stages to achieve a tuned suspension for all load conditions imposed are shown in the accompanying drawings, wherein.

DESCRIPTION OF THE EMBODIMENTS

Figure 1:
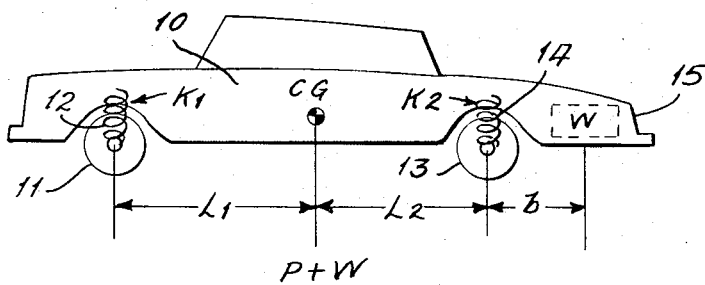
FIG. 1 is a schematic side elevational view of a passenger type vehicle with the various components and symbols indicated thereon.

In FIG. 1 there is represented a passenger type vehicle having a body or sprung mass 10 with its center of gravity represented at the center of gravity point CG which is also the location of the normal weight P with two passengers seated in the front seat and no load added in the trunk other than the usual spare tire and jack. Front wheels 11 are connected to the body by coil springs 12 having a rate $K_1$ and rear wheels 13 are connected to the body by coil springs 14 having a rate $K_2$. The trunk space 15 in the body 10 is shown with an added load W located at a distance $b$ behind the rear wheel axle. The axle for the front wheels 11 is located a distance $L_1$ from the center of gravity, and the axle for the rear wheels 13 is located at a distance $L_2$ behind the center of gravity.

In this vehicle of FIG. 1 the front coil springs 12 have a rate $K_1$ which is the effective force that is required to raise the wheels one inch. In like manner the rate of the rear coil springs 14 is $K_2$. When the load W is placed in the trunk it has the effect of shifting the center of gravity or CG rearwardly so that $L_1$ increases and $L_2$ decreases. Thus, it can be seen that there is a definite relation between the front and rear spring rates in order to achieve a smooth, comfortable ride. This concept is referred to as "suspension tuning" and is expressed by the following equation:

$$K_1 L_1 = K_2 L_2 \qquad (1)$$

It is understood that the addition of the load W in the vehicle trunk will shorten the distance $L_2$ and lengthen the distance $L_1$. From equation 1, if $K_1$ of the front springs is maintained constant then $K_2$ of the rear springs must increase to maintain the "suspension tuning". The balancing of the rear coil spring rate $K_2$ in relation to the front coil spring rate $K_1$ is an important objective of this improvement. Tuning of the suspension coil springs may be expressed by the following equation:

$$K_2 = K_1 [(L_{1_0} + L_{2_0} + b) W + L_{1_0} P]/[L_{2_0} P - bW] \qquad (2)$$

Where $L_{1_0} = L_1$ when $W = 0$
$L_{2_0} = L_2$ when $W = 0$

When constant rate springs are employed at the front and rear, as is the rule today in vehicle systems, the addition of the load W causes the suspension springs to go out of balance. However, when the proposed variable rate spring is employed for the rear wheel suspension, the overall suspension system remains tuned and in balance. While variable rate springs have been proposed in the past, none has been able to maintain a tuned suspension for a variety of loads in the trunk. The automotive industry normally has designed a vehicle suspension such that the optimum ride characteristics are obtained when the vehicle is carrying two average weight riders in the front seat and only the spare tire and jack in the rear or trunk. It is known, however, that the ride characteristics rapidly deteriorate as additional load is placed in the rear trunk space. Thus, it is the purpose of this invention to maintain the optimum ride characteristics as load is added to the rear trunk space by keeping the front and rear wheel suspensions in tune and balance. Investigation of the problem has shown that a tuned or balanced suspension is achieved through the use of rear variable rate springs where the rate increases with respect to load increases and with respect to deflection according to equation 2. Therefore, it is found that increased load carrying capacity is achieved automatically by the increasing rear spring rate.

Figure 2:
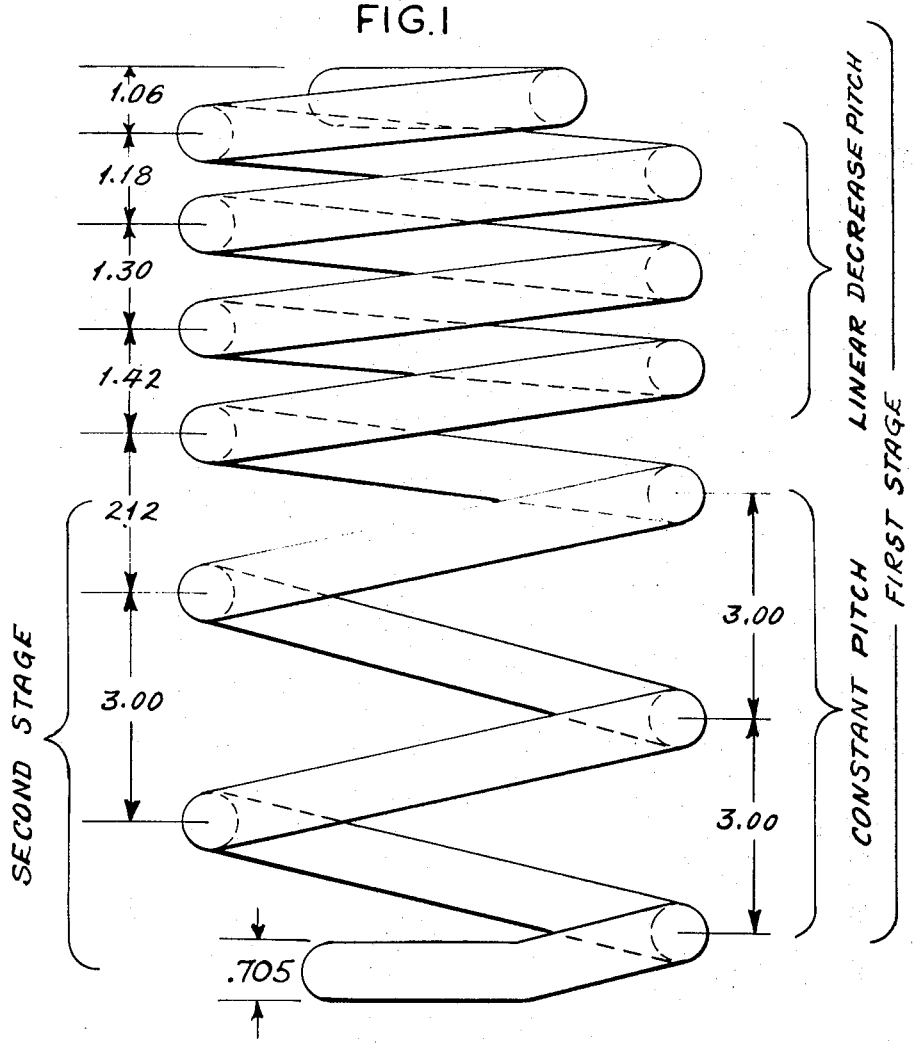
FIG. 2 is a greatly enlarged elevational view of a variable rate coil spring of the character to be referred to hereinafter for application as the rear suspension springs for the vehicle of FIG. 1.

The variable rate objective is applied to a vehicle rear coil spring by providing a two stage spring, where the first stage comprises the action of the entire spring and the second stage has a substantially constant pitch. Such a spring 14 is illustrated in FIG. 2 where a portion of the coils in the spring have an increasing pitch and are spaced such that the rate increases according to equation 2.

The various terms in the foregoing equation are illustrated and explained in connection with the description of FIG. 1. The principle here is that the rear spring 14 must have a variable rate to maintain the suspension tuned and in balance. For maximum load carrying ability of the vehicle 10 the front springs 12 are held to a constant rate while the rear springs 14 have a variable rate.

It has been found through complicated mathematical analysis that both optimum ride characteristics under load and increased load capability of the vehicle are satisfied together. It has also been found that the variable rate spring which satisfies the foregoing requirements needs to have a percentage of the total coils cancelled out just by the normal vehicle weight. This apparently has not appeared before and might be considered a waste of steel, but it improves the operation of the coil spring by lowering the noise level caused by coil clash, while leading to a gradual rate increase under all loads imposed on the vehicle. The coil clash referred to is understood to be produced by adjacent coils hammering on each other as load is applied and released. This is especially noticeable where the coil turns are relatively close together and have a very low pitch.

In producing a variable rate coil spring for use with passenger vehicles, for example, it has been found that it is easiest to produce a spring having linearly increasing pitch. Such a spring yields a natural frequency which is not constant for all loads.

The suspension system for the vehicle depicted in FIG. 1 includes front suspension coil springs 12 which have a constant pitch and a constant rate, and rear coil springs 14 which have a linearly increasing pitch at certain coils and a constant pitch at other coils so that the rate of the front and rear coil springs varies in a manner that will keep the suspension in balance under all loading conditions. A typical rear suspension spring has been illustrated in FIG. 2. The example shown is of a spring having a coil diameter of 5.50 inches. It is formed from stock having a diameter of 0.705 inches. The coil has a constant pitch of three inches, for two turns up from the bottom seat portion. Thereafter the coil turns have a variable pitch as indicated for the next three turns.

The balance characteristics referred to here by definition is achieved by maintaining the front suspension natural frequency equal to the rear suspension natural frequency. This can be mathematically expressed in the form $K_1L_1 = K_2L_2$. The front suspension generally has a constant rate, but not a constant natural frequency. Thus, as load is added to the trunk of the vehicle, the loading on the front suspension decreases. Therefore, the natural frequency of the rear suspension must vary as load is applied in the trunk in accordance with the change in natural frequency of the front suspension. This can be mathematically shown and has been referred to above in equation 1.

Figure 3:
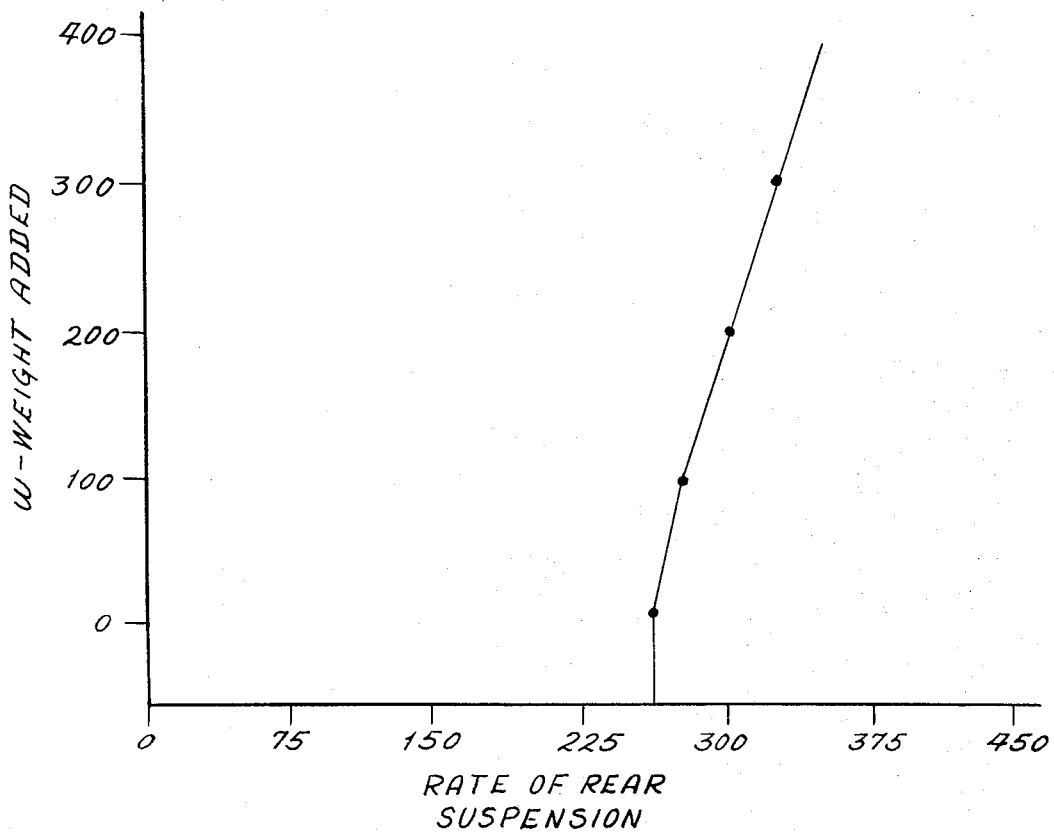
FIG. 3 is a graph to illustrate the principle of the variable rate spring characteristics for the coil spring seen in FIG. 2.
Figure 4:
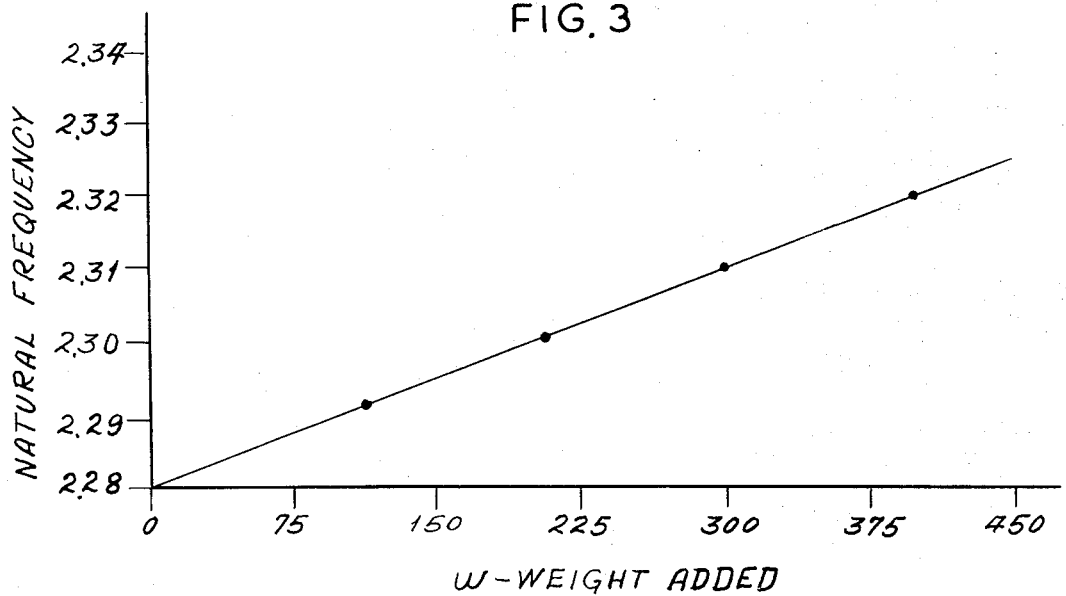
FIG. 4 is a graph to relate the natural frequency of both front and rear suspension systems with weight added to the trunk space of a passenger type vehicle.

In the graph of FIG. 4 the natural frequency of the front suspension is plotted against the load W placed in the vehicle trunk space. It has been stated that in order to maintain balance of the total vehicle suspension under all load conditions the natural frequency of the rear suspension must be equal to the natural frequency of the front suspension. Therefore, the graph in FIG. 4 is also a plot of the natural frequency of the rear suspension against the load W added in the trunk space for the proposed variable rate spring. In order to meet this condition a relationship must exist between the load W added in the trunk space and the rate of the rear suspension spring. In the graph of FIG. 3 the rear suspension spring rate in pounds per inch of deflection is plotted against the load W placed in the vehicle trunk space 15.

While the foregoing description has related to a suspension system employing coil springs, it is evident that a leaf spring system can be employed with similar results where the front and rear springs have substantially equal natural frequencies, the front spring natural frequency varies with loading and the rear spring has variable rate characteristics as described.

What is claimed is:

1. In a vehicle, a frame having a principal suspension system consisting of a front wheel set, first resilient spring means operably connecting said front wheel set to the vehicle frame, a rear wheel set, second resilient spring means operably connecting said rear wheel set to the vehicle frame, said frame supporting an applied load of a variable amount and disposition relative to said front and rear wheel sets, said first resilient spring means having a natural frequency which varies with the vehicle loading amount and disposition conditions, and said second resilient spring means having a natural frequency varying with the variations of said first resilient spring means such that the natural frequencies of said first and second resilient spring means remain substantially balanced with the loading conditions.

2. The suspension system of claim 1 wherein said second resilient spring means include sections having a constant pitch and other sections having a variable pitch.

3. The suspension system of claim 1 wherein the vehicle has its center of gravity between said front and rear wheel sets, and said second resilient spring means has a variable rate operative in relation to said first resilient spring means to maintain a substantially balanced system for a variety of loads applied to the vehicle adjacent said rear wheel set.

4. A suspension assembly for a vehicle consisting of a front wheel set connected to the vehicle ahead of the center of gravity and a rear wheel set connected to the vehicle behind the center of gravity, front coil suspension spring means connecting said front wheel set to the vehicle, said front coil springs having a constant rate $K_1$, rear coil suspension spring means connecting said rear wheel set to the vehicle, said rear coil springs having a variable rate $K_2$, and said front and rear coil suspension springs having substantially equal natural frequencies for changes in the loading of the vehicle and said real coil suspension springs having a spring rate that varies with load applied to the vehicle.

5. In a vehicle suspension system, a longitudinal frame having a normal load center of gravity, front and rear wheels for said frame, principal suspension means connecting said front wheels to the foreport of said frame a predetermined distance $L_1$ from the center of gravity and having a substantially constant rate $K_1$, and principal coil suspension springs connecting said rear wheel to the rear part of said frame a predetermined distance $L_2$ from the center of gravity, said principal coil suspension springs having a portion of the coils formed with a constant pitch and another portion with an increasing pitch such that the rate $K_2$ of said suspension springs increases with applied load according to the formula $$K_2 = K_1 [(L_{1_0} + L_{2_0} + b) W + L_{1_0} p ]/[L_{2_0} p - bW]$$

6. In a vehicle, a longitudinal body frame, front supporting wheels resiliently connected to the forepart of said body frame, said resilient connection of said front wheels comprising principal coil springs having a substantially constant rate, rear wheels for said body frame, principal coil suspension springs operatively connected between said rear wheels and the rear part of said body frame, said rear wheel coil springs having a linear increasing pitch for certain of its coils and constant pitch for certain others of its coils such that the rate of said coil springs varies in a manner to maintain the front and rear portion of said body frame in balance under all loading conditions, and said vehicle having the center of gravity, due to normal load only, located a distance $L_1$ from the front wheels, the rear wheels located a distance $L_2$ from the center of gravity, the front wheel coil springs having a constant rate $K_1$, the rear wheel coil springs having a variable rate $K_2$, and the rate $K_2$ increasing with load in accordance with the relation $$K_2 = K_1 [(L_{1_0} + L_{2_0} + b) W + L_{1_0} p ]/[L_{2_0} p - bW]$$

* * * * *